UNITED STATES PATENT OFFICE.

DAVID A. CUTLER, OF MOUNT VERNON, NEW YORK.

ART OF DEVULCANIZING RUBBER.

1,078,086. Specification of Letters Patent. Patented Nov. 11, 1913.

No Drawing. Application filed January 24, 1912. Serial No. 673,057.

*To all whom it may concern:*

Be it known that I, DAVID A. CUTLER, a citizen of the United States, and a resident of Mount Vernon, county of Westchester, and State of New York, have invented a new and useful Improvement in the Art of Devulcanizing Rubber, of which the following is a specification.

The ultimate object of this invention is to so treat vulcanized goods containing fiber as to devulcanize the rubber and destroy the fiber and obtain devulcanized rubber of such constitution as to be superior for use in the manufacture of new rubber goods.

In devulcanizing rubber goods containing cotton fiber, such as old automobile tires, I prefer to proceed as follows: In a tank provided with a loose cover, I place water and add thereto zinc chlorid and mix the two thoroughly. The rubber goods are placed therein after being ground so as to pass through a 3 to 5 to the inch mesh screen. The mass is thoroughly mixed by machinery or hand. The oil hereinafter described is then distributed over the surface of the mass and thoroughly mixed therewith by machinery or hand. The tank is loosely covered and is run into a devulcanizing oven which oven is closed so as to maintain pressure and temperature corresponding with about 100 pounds steam pressure applied either by admitting the steam into a steam jacket surrounding the oven or directly into the oven. The tank and its contents are permitted to remain under this temperature and pressure for about 22 hours, after which the mass is removed from the tank, washed and batched on a mill and dried. I prefer to apply the heat and pressure by passing the current of steam of about 100 pounds pressure through the closed devulcanizing oven so that said steam circulates not only over, but also in contact with the sides and bottom of the metal tank containing the mass and thereby applies the heat to the mass from every direction. The proportions of the above ingredients that I prefer to employ are as follows: 35 pounds ground tires, 87½ pounds water, 17½ ounces zinc chlorid, 4 pounds 6 ounces said oil. I do not limit myself to the exact proportions or conditions above stated, as they may vary according to the nature of the rubber goods treated, the nature of the fiber contained therein and the conditions of manufacture. Although I do not limit myself to the grade of zinc chlorid, nevertheless that which I employ is commercially known as zinc chlorid dry technical iron free.

Where the rubber goods treated are old boots and shoes, I pursue substantially the same process with the following variations; the substances are in substantially the following proportions: 600 grams water, 105 grams zinc chlorid, 200 grams boots and shoes, 2 grams said oil. In this case, the heat and pressure would be equivalent to about 125 pounds steam pressure.

The oil employed in my process is a distillate of pine wood having a specific gravity between that of oil of turpentine and that of resin oil. In other words, between about .88 and .96 at 15° C. More specifically, the oil that I have employed is about from .93 to .95 specific gravity and may be obtained as a distillate from the stumps of long leaf pine trees (*Pinus palustrius*) by distilling according to the well known resin or other bath process in which the bath has a higher boiling point than the distilling temperature of the oil. This oil is to be found on the market and may be further identified by the fact that the greater part of its bulk in a dry still at atmospheric pressure will distil over at a temperature between about 200 and 220 C. The preferable specific gravity of the oil is from .935 to .945 at 15° C. Before use in my process, I prefer to subject such oil to a refining distillation according to either of the following examples:

Example 1 started with a commercial oil of the kind above referred to having a specific gravity of about .945 and an optical rotation of about minus 3° 54'. This starting oil is subjected to steam distillation either by the passage of steam or by the heating of the oil in the presence of water until the distillate begins to grow dark. The temperature of the distilling vapors is with trifling variations about 212° F. The product of this distillation showed a specific gravity of .943 and an optical rotation of minus 3° 15'.

Example 2 started with an oil of the same specific gravity and rotation and the distillation was conducted under the same conditions excepting that salt (sodium chlorid) was added in the proportion of 165 grams of salt to 2500 cc. of oil and 3000 cc. of water. The product of this example showed a specific gravity of .943 and an optical rotation of minus 3° 15'.

Example 3 started with oil of the same specific gravity and optical rotation and the distillation was conducted under the same conditions as in the second example excepting that to the oil, water and salt was added amylacetate in the proportion of 25 cc. The product of this example showed a specific gravity of .942 and an optical rotation of minus 3° 15'.

Example 4 started with similar oil having a specific gravity of .943 and an optical rotation of minus 4° 24' and resulted in a finished oil product having a specific gravity of .940 and an optical rotation of minus 4° 0'. This fourth example of the process was carried on as follows: 54 pounds of ordinary salt (sodium chlorid) were dissolved in 41 gallons of water, to which solution were added 800 pounds of said oil; 20 pounds of *Eucalyptus globulus*, 20 pounds of oil of citronella and 8 pounds of amylacetate. The mass was distilled slowly in a copper still of about 300 gallons capacity heated by steam coils containing steam at about 40 pounds pressure. A thermometer placed in the vapor at the top of the still showed about 212° F. This distillation occupied about 30 hours. I have also found in the production of the oil set forth in this example (4), that the salt and amylacetate may be omitted, and equally good results obtained by such oil in the process of devulcanization.

In each of the above examples, the product is dried by decantation and the product of each example forms a slightly turbid solution in equal volumes of 70% grain alcohol at ordinary temperature.

I do not wish to be understood as limiting myself to the oil above described to the exclusion of other devulcanizing agents in conjunction with the zinc chlorid.

What I claim and desire to secure by Letters Patent is:—

1. The process of treating vulcanized rubber goods which consists in subjecting the same to a bath containing zinc chlorid and oil of pine of between .88 and .96 specific gravity.

2. The process of treating vulcanized rubber goods which consists in subjecting the same to a bath containing zinc chlorid and oil of pine of between about .93 to .95 specific gravity.

In testimony whereof, I have hereunto signed my name in the presence of two subscribing witnesses.

DAVID A. CUTLER.

Witnesses:
M. E. McNinch,
C. G. Heylmur.